US012749924B2

(12) United States Patent
Lin et al.

(10) Patent No.: US 12,749,924 B2
(45) Date of Patent: Sep. 29, 2026

(54) MULTI-COIL WIRELESS CHARGER

(71) Applicant: Apple Inc., Cupertino, CA (US)

(72) Inventors: Ruiyang Lin, Milpitas, CA (US); Adam L Schwartz, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 907 days.

(21) Appl. No.: 18/164,745

(22) Filed: Feb. 6, 2023

(65) Prior Publication Data

US 2024/0186836 A1 Jun. 6, 2024

Related U.S. Application Data

(60) Provisional application No. 63/385,737, filed on Dec. 1, 2022.

(51) Int. Cl.

| | |
|---|---|
| ***H02J 50/40*** | (2016.01) |
| ***H01F 27/24*** | (2006.01) |
| ***H02J 50/00*** | (2016.01) |
| ***H02J 50/12*** | (2016.01) |

(52) U.S. Cl.

CPC ............ *H02J 50/402* (2020.01); *H01F 27/24* (2013.01); *H02J 50/005* (2020.01); *H02J 50/12* (2016.02)

(58) Field of Classification Search

CPC .......... H02J 50/40; H02J 50/402; H02J 50/12; H02J 50/00; H02J 50/005; H01F 27/24

See application file for complete search history.

(56) References Cited

U.S. PATENT DOCUMENTS

| | | | |
|---|---|---|---|
| 2011/0111542 A1 | 5/2011 | Toivola et al. | |
| 2022/0045527 A1 | 2/2022 | Karanikos et al. | |

FOREIGN PATENT DOCUMENTS

| | | | | |
|---|---|---|---|---|
| CN | 115276268 A | * 11/2022 | ............. H02J 50/10 |
| EP | 3799252 A1 | 3/2021 | |
| WO | 2022140612 A1 | 6/2022 | |
| WO | 2022177589 A1 | 8/2022 | |

OTHER PUBLICATIONS

International Search Report and Written Opinion for PCT Application No. PCT/US2023/081171 dated Mar. 26, 2024; 13 pgs.

* cited by examiner

*Primary Examiner* — Robert L Deberadinis

(74) *Attorney, Agent, or Firm* — FLETCHER YODER PC

(57) ABSTRACT

A multi-coil wireless power transfer (WPT) arrangement can include a magnetic core; first and second WPT coils positioned adjacent one another above the magnetic core; a third WPT coil positioned above the first and second wireless power transfer coils; a magnet ring located above the first and second wireless power transfer coils; additional magnetic core material disposed atop the magnetic core and associated with the third WPT coil. The first and second WPT coils can be separated by a separation distance selected to accommodate the additional magnetic core material; and a segmented metallic shield positioned between the magnet ring and the first and second wireless power transfer coils. The additional magnetic core material can include a base portion disposed atop the magnetic core and beneath the third wireless power transfer coil and/or a post portion disposed atop the base portion and within the third wireless power transfer coil.

24 Claims, 4 Drawing Sheets

MULTI-COIL WIRELESS CHARGER

CROSS-REFERENCE TO RELATED APPLICATIONS

This application claims the benefit of U.S. Provisional Application No. 63/385,737, filed Dec. 1, 2022, entitled “MULTI-COIL WIRELESS CHARGER,” which is hereby incorporated by reference in its entirety for all purposes.

BACKGROUND

Various electronic devices have wireless power transfer capabilities. For example, battery powered electronic devices, such as smart phones, tablet computers, smart watches, wireless earphones, styluses, etc. may employ wireless power transfer to facilitate charging of batteries within the devices. Various applications may have different requirements for the physical configuration of the wireless power transfer structures.

SUMMARY

A multi-coil wireless power transfer arrangement can include a magnetic core; first and second wireless power transfer coils positioned adjacent one another above the magnetic core; a third wireless power transfer coil positioned above the first and second wireless power transfer coils; a magnet ring located above the first and second wireless power transfer coils; additional magnetic core material disposed atop the magnetic core and associated with the third wireless power transfer coil, wherein the first and second wireless power transfer coils are separated by a separation distance selected to accommodate the additional magnetic core material; and a segmented metallic shield positioned between the magnet ring and the first and second wireless power transfer coils. The additional magnetic core material can include a base portion disposed atop the magnetic core and beneath the third wireless power transfer coil and a post portion disposed atop the base portion and within the third wireless power transfer coil. The separation distance can be further selected to reduce coupling between the first or second wireless power transfer coil and the third wireless power transfer coil.

A multi-coil wireless power transfer arrangement can include a magnetic core, first and second wireless power transfer coils positioned adjacent one another above the magnetic core, a third wireless power transfer coil positioned above the first and second wireless power transfer coils, and a magnet array located above the first and second wireless power transfer coils. The first, second, and third wireless power transfer coils can be part of an array of wireless power transfer coils, the array including multiple first and second wireless power transfer coils and multiple third wireless power transfer coils.

The multi-coil wireless power transfer arrangement can further include additional magnetic core material associated with the third wireless power transfer coil. The additional magnetic core material can include at least one base portion disposed atop the magnetic core and beneath the third wireless power transfer coil. The magnetic core material can include at least one post portion disposed atop the base portion and within the third wireless power transfer coil. The additional magnetic core material can be affixed to the magnetic core or formed integrally with the magnetic core. The first and second wireless power transfer coils can be separated by a distance selected to accommodate the additional magnetic core material and/or a distance selected to reduce coupling between the first or second wireless power transfer coil and the third wireless power transfer coil. The first and second wireless power transfer coils can have at least one of a different operating mode or a different operating frequency than the third wireless power transfer coil.

The multi-coil wireless power transfer arrangement can further include a shield positioned beneath the magnet ring. The shield can be a segmented metallic ring. The multi-coil wireless power transfer arrangement can include a shield positioned above the magnet ring. The shield can be a segmented metallic ring.

A wireless power transfer device can include power conversion circuitry coupled to a multi-coil wireless power transfer arrangement, and control circuitry coupled to the power conversion circuitry that operates the power conversion circuitry to facilitate wireless power transfer via the multi-coil wireless power transfer arrangement that further includes a magnetic core, first and second wireless power transfer coils positioned adjacent one another above the magnetic core, a third wireless power transfer coil positioned above the first and second wireless power transfer coils, and a magnet ring located above the first and second wireless power transfer coils. The wireless power transfer device can further include additional magnetic core material associated with the third wireless power transfer coil. The first and second wireless power transfer coils can be separated by a distance selected to allow for at least one of accommodating the additional magnetic core material or reducing coupling between the first or second wireless power transfer coil and the third wireless power transfer coil. The first and second wireless power transfer coils can have a different operating mode or a different operating frequency than the third wireless power transfer coil. The control circuitry can be configured to perform foreign object detection by power accounting and to adapt a loss estimation portion of the power accounting based on which of the first, second, or third wireless power transfer coils is in use. The wireless power transfer device can further include a segmented metallic shield positioned between the magnet ring and the first and second wireless power transfer coils.

DETAILED DESCRIPTION

Figure 1:
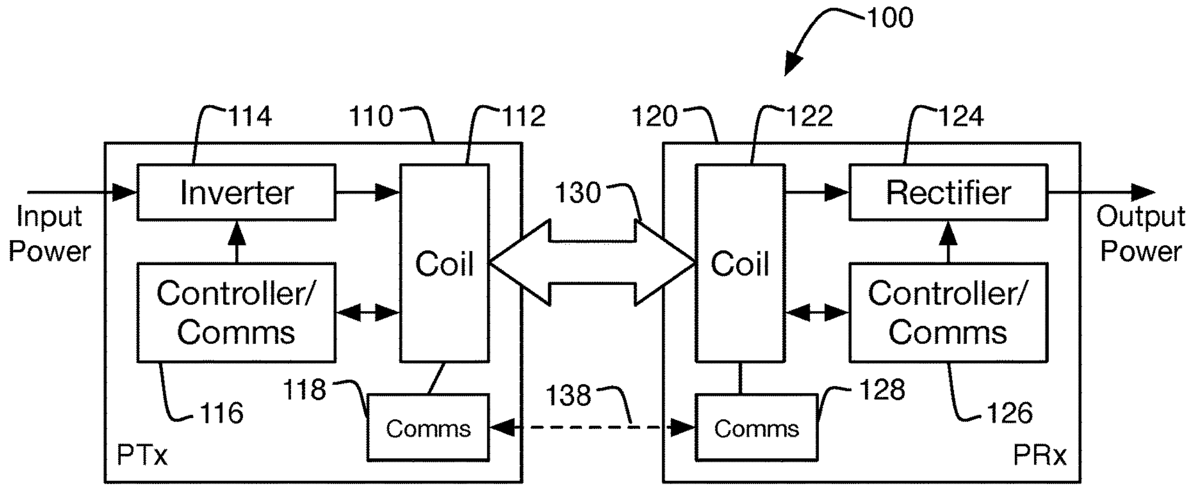
FIG. 1 illustrates a simplified block diagram of a wireless power transfer system.

In the following description, for purposes of explanation, numerous specific details are set forth to provide a thorough understanding of the disclosed concepts. As part of this description, some of this disclosure’s drawings represent structures and devices in block diagram form for sake of simplicity. In the interest of clarity, not all features of an actual implementation are described in this disclosure.

Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a simplified block diagram of a wireless power transfer system 100. Wireless power transfer system includes a power transmitter (PTx) 110 that transfers power to a power receiver (PRx) 120 wirelessly, such as via inductive coupling 130. Power transmitter 110 may receive input power that is converted to an AC voltage having particular voltage and frequency characteristics by an inverter 114. Inverter 114 may be controlled by a controller/communications module 116 that operates as further described below. In various embodiments, the inverter controller and communications module may be implemented in a common system, such as a system based on a microprocessor, microcontroller, or the like. In other embodiments, the inverter controller may be implemented by a separate controller module and communications module that have a means of communication between them. Inverter 114 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

Inverter 114 may deliver the generated AC voltage to a transmitter coil 112. In addition to a wireless coil allowing magnetic coupling to the receiver, the transmitter coil block 112 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. Other arrangements are also possible and may be used in conjunction with the various embodiments described herein. The wireless transmitter coil may also include a core of magnetically permeable material (e.g., ferrite) configured to affect the flux pattern of the coil in a way suitable to the particular application. The teachings herein may be applied in conjunction with any of a wide variety of transmitter coil arrangements appropriate to a given application.

PTx controller/communications module 116 may monitor the transmitter coil and use information derived therefrom to control the inverter 114 as appropriate for a given situation. For example, controller/communications module may be configured to cause inverter 114 to operate at a given frequency or output voltage depending on the particular application. In some embodiments, the controller/communications module may be configured to receive information from the PRx device and control inverter 114 accordingly. This information may be received via the power transmission coils (i.e., in-band communication) or may be received via a separate communications channel (not shown, i.e., out-of-band communication). For in-band communication, controller/communications module 116 may detect and decode signals imposed on the magnetic link (such as voltage, frequency, or load variations) by the PRx to receive information and may instruct the inverter to modulate the delivered power by manipulating various parameters of the generated voltage (such as voltage, frequency, etc.) to send information to the PRx. In some embodiments, controller/communications module may be configured to employ frequency shift keying (FSK) communications, in which the frequency of the inverter signal is modulated, to communicate data to the PRx. Controller/communications module 116 may be configured to detect amplitude shift keying (ASK) communications or load modulation-based communications from the PRx. In either case, the controller/communications module 126 may be configured to vary the current drawn on the receiver side to manipulate the waveform seen on the Tx coil to deliver information from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 116 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PTx device 110 may optionally include other systems and components, such as a separate communications module 118. In some embodiments, comms module 118 may communicate with a corresponding module tag in the PRx via the power transfer coils. In other embodiments, comms module 118 may communicate with a corresponding module using a separate physical channel 138.

As noted above, wireless power transfer system also includes a wireless power receiver (PRx) 120. Wireless power receiver can include a receiver coil 122 that may be magnetically coupled 130 to the transmitter coil 112. As with transmitter coil 112 discussed above, receiver coil block 122 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board.

Other arrangements are also possible and may be used in conjunction with the various embodiments described herein. The wireless receiver coil may also include a core of magnetically permeable material (e.g., ferrite) configured to affect the flux pattern of the coil in a way suitable to the particular application. The teachings herein may be applied in conjunction with any of a wide variety of receiver coil arrangements appropriate to a given application.

Receiver coil 122 outputs an AC voltage induced therein by magnetic induction via transmitter coil 112. This output AC voltage may be provided to a rectifier 124 that provides a DC output power to one or more loads associated with the PRx device. Rectifier 124 may be controlled by a controller/communications module 126 that operates as further described below. In various embodiments, the rectifier controller and communications module may be implemented in a common system, such as a system based on a microprocessor, microcontroller, or the like. In other embodiments, the rectifier controller may be implemented by a separate controller module and communications module that have a means of communication between them. Rectifier 124 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

PRx controller/communications module 126 may monitor the receiver coil and use information derived therefrom to control the rectifier 124 as appropriate for a given situation. For example, controller/communications module may be configured to cause rectifier 124 to operate provide a given output voltage depending on the particular application. In some embodiments, the controller/communications module may be configured to send information to the PTx device to effectively control the power delivered to the receiver. This information may be received sent via the power transmission coils (i.e., in-band communication) or may be sent via a separate communications channel (not shown, i.e., out-of-band communication). For in-band communication, controller/communications module 126 may, for example, modulate load current or other electrical parameters of the received power to send information to the PTx. In some embodiments, controller/communications module 126 may be configured to detect and decode signals imposed on the magnetic link (such as voltage, frequency, or load variations) by the PTx to receive information from the PTx. In some embodiments, controller/communications module 126 may be configured to receive frequency shift keying (FSK) communications, in which the frequency of the inverter signal has been modulated to communicate data to the PRx. Controller/communications module 126 may be configured to generate amplitude shift keying (ASK) communications or load modulation-based communications from the PRx. In either case, the controller/communications module 126 may be configured to vary the current drawn on the receiver side to manipulate the waveform seen on the Tx coil to deliver information from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 126 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry. PRx device 120 may optionally include other systems and components, such as a communications ("comms") module 128. In some embodiments, comms module 128 may communicate with a corresponding module in the PTx via the power transfer coils. In other embodiments, comms module 128 may communicate with a corresponding module or tag using a separate physical channel 138.

Numerous variations and enhancements of the above-described wireless power transmission system 100 are possible, and the following teachings are applicable to any of such variations and enhancements.

Figure 2:
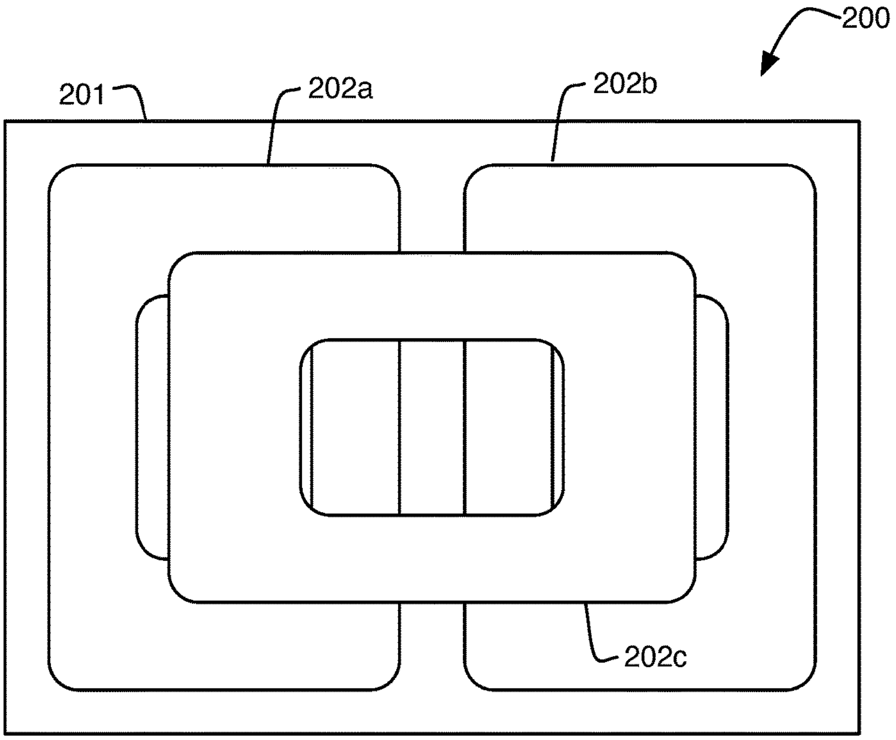
FIG. 2 illustrates a coil configuration of a wireless power transfer device.

FIG. 2 illustrates a coil configuration 200 of a wireless power transfer device. The wireless power transfer device could be a wireless power transmitter, a wireless power receiver, or both, i.e., having a wireless power transfer system that can transmit or receive power wirelessly via the coil arrangement. As one example, a smartphone could have a bi-directional wireless power transfer system capable of charging the phone's internal battery when acting as a wireless power receiver or charging an accessory device, such as wireless earphones, when acting as a wireless power transmitter. The amount of power that can be transferred wirelessly and the efficiency of that power transfer can be affected by the relative positioning of the transmit and receive coils and the degree of magnetic coupling between them. Some coil configurations, such as coil configuration 200, can provide improved magnetic coupling and a higher degree of flexibility with respect to such positioning by using multiple coils. In configuration 200 of FIG. 2, three coils 202*a*, 202*b*, and 202*c* are provided.

The three coils 202*a*, 202*b*, and 202*c* may, for example, be arranged in what is called a DDQ configuration. Such a configuration is so named because the lower two coils 202*a* and 202*b* are arranged in a shape that is reminiscent of two "D"s, while the third coil 202*c* is layered above them and operated with an electrical phase angle of 90 degrees with respect to them, thus being a "quadrature" coil. The DDQ configuration is just one example of how multiple coils could be configured to allow for improved coupling between transmit and receive coils and/or greater alignment tolerance. An additional component of coil configuration 200 can be a magnetic core 201 such as a ferrite "sheet." Such core elements can provide various advantages, such as steering, directing, containing, or shielding other device components from magnetic flux associated with operation of the wireless power transfer coils. Additionally, although referred to as a ferrite sheet, the core element need not be strictly planar, nor need it be made from ferrite. Any material with suitable magnetic properties (e.g., magnetic permeability) could be used depending on the requirements of a particular application, and the shape need not be planar. Likewise, any core shape that achieves the various flux directing, steering, containing, or shielding objectives of a particular system could be used. Various multi-coil designs and associated core shapes have been proposed, the particulars of which are either known by or available to those ordinarily skilled in the art, and thus such particulars are not repeated herein.

Figure 3:
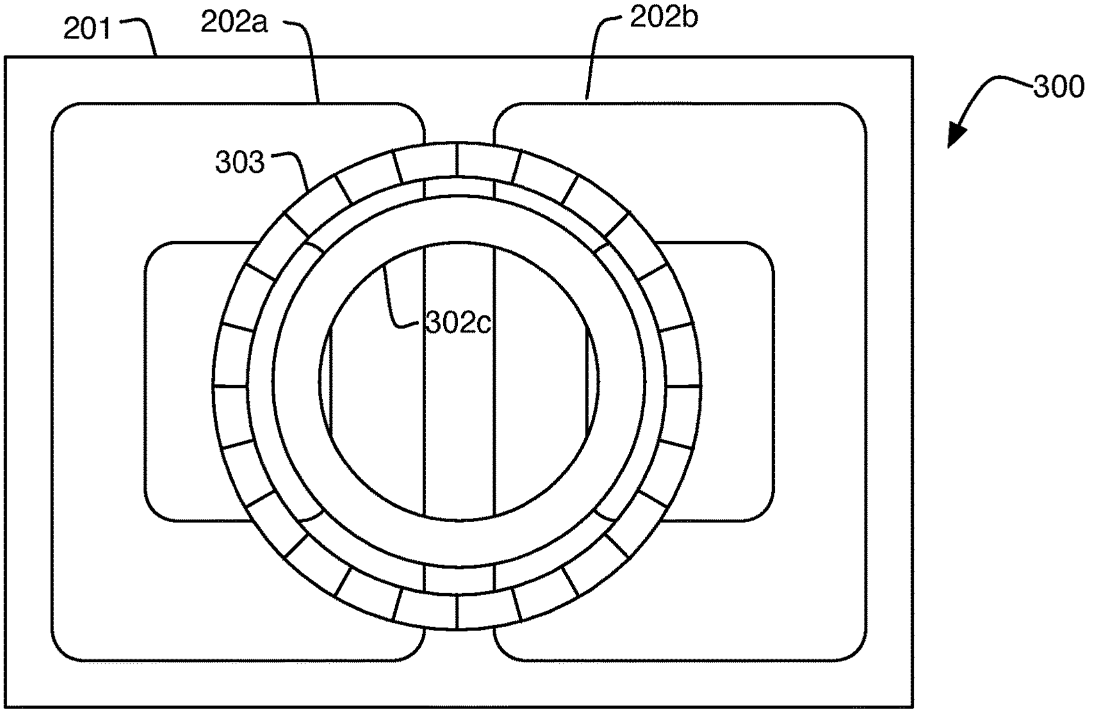
FIG. 3 illustrates an alternative coil configuration of a wireless power transfer device

FIG. 3 illustrates an alternative coil configuration 300 of a wireless power transfer device. as above, the wireless power transfer device could be a wireless power transmitter, a wireless power receiver, or both. In coil configuration 300, the magnetic core 201 and lower layer coils 202*a* and 202*b* can be as described above with respect to FIG. 2. However, the third coil 302 can be a coil of a different type. In some embodiments, a wireless power transfer device could be constructed using three coils as illustrated in FIG. 3. In other embodiments, a wireless power transfer device could be constructed using an array of coils as illustrated in FIG. 3. For example, the array could be a rectangular array include multiple rows and/or multiple columns of coils as illustrated in FIG. 3. Alternatively, a circular array could include multiple coil groups as illustrated in FIG. 3 arranged in a circular pattern. In other words, such an array could include multiple groups of the three coils illustrated in FIG. 3.

As but one non-limiting example, coils 202*a* and 202*b* could be coils designed to be used in accordance with an industry standard wireless power transfer configuration, such as one or more versions of the Qi standard promulgated by the Wireless Power Consortium. As another non-limiting example, third coil 302*c* could be designed to be used in accordance with an alternative industry standard or a proprietary wireless power transfer configuration, such as the MagSafe™ wireless power transfer coil by Apple Inc. As another non-limiting example, third coil 302*c* could be designed to be used in accordance with one or more versions of the Qi standard different from that of one or more of coils 202*a* and 202*b*. Adjacent to coil 302*c* is, in some implementations, an array of magnets 303 that is provided to secure the wireless power transfer device to another device, such as a charger or an external accessory. In the illustrated example, magnetic array 303 is a magnet ring that includes a plurality of magnets curved magnets disposed in a circular configuration. The circular configuration may be continuous (illustrated) or segmented with spacing in-between adjacent magnets (not illustrated). Optionally, the magnets of magnet ring 303 may be individually curved to facilitate the overall arcuate configuration of ring 303. Other magnet configurations could also be used. For example, fewer magnets could be provided, with spaces between the individual magnet segments. Additionally, the disposition of the magnets need not be circular, with polygonal, ellipsoidal, or other configurations also being used. In fact, any array of a plurality of magnets could be used depending on the requirements of a particular application. Coil 302*c* could also be (but need not be) of any other configuration that differs from coils 202*a* and 202*b*, including, without limitation, operating at a different frequency, operating in a different mode, operating with a different power transfer level or capability, etc.

Figure 4:
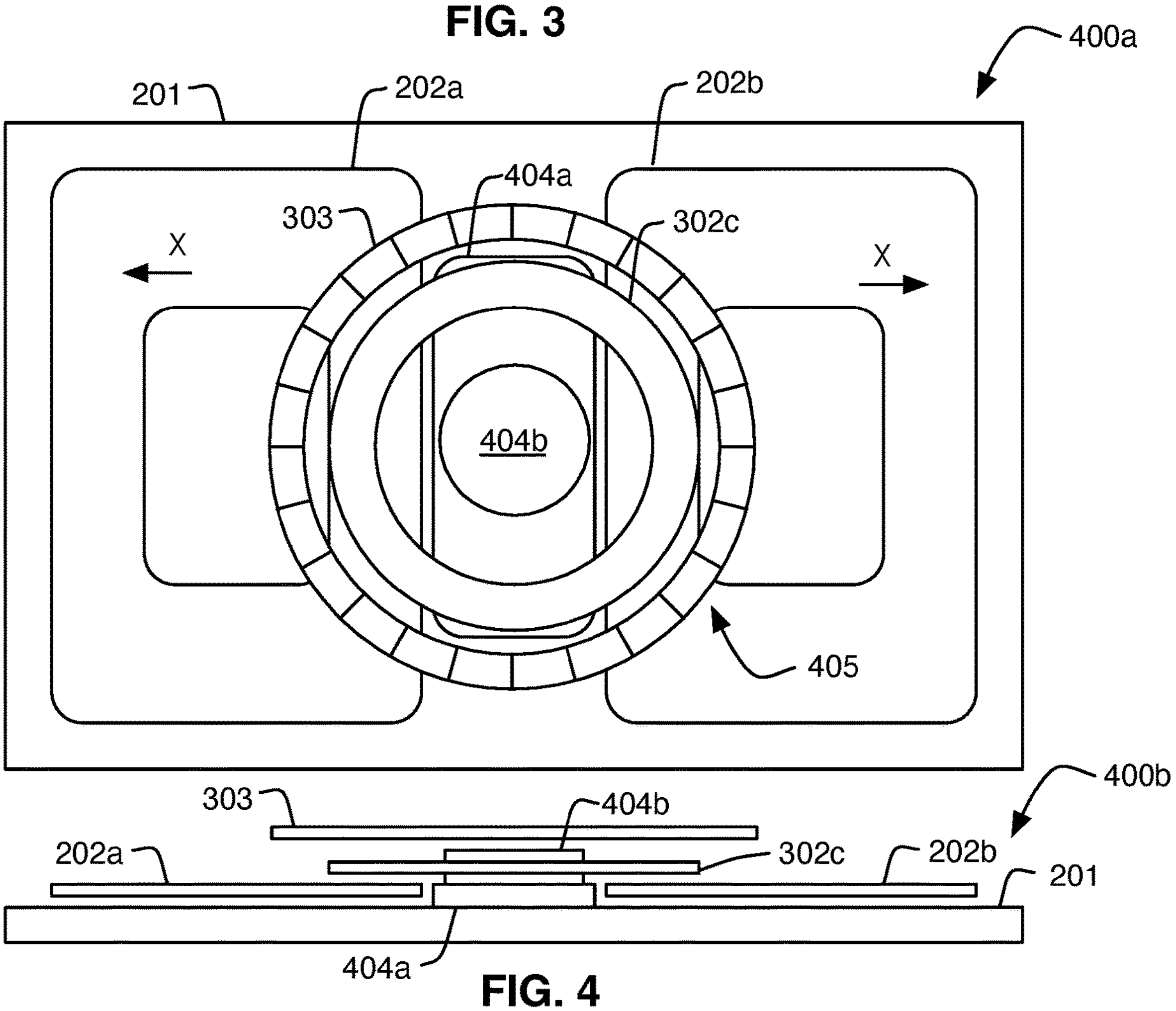
FIG. 4 illustrates further details of an alternative coil configuration of a wireless power transfer device.

FIG. 4 illustrates further details of an alternative coil configuration 400*a*/400*b* of a wireless power transfer device incorporating different coil types. In some embodiments, a wireless power transfer device could be constructed using three coils as illustrated in FIG. 3. In other embodiments, a wireless power transfer device could be constructed using an array of coils as illustrated in FIG. 3. For example, the array could be a rectangular array include multiple rows and/or multiple columns of coils as illustrated in FIG. 3. Alternatively, a circular array could include multiple coil groups as illustrated in FIG. 3 arranged in a circular pattern. In other words, such an array could include multiple groups of the three coils illustrated in FIG. 3. View 400*a* is a plan view of the coil configuration similar to that presented in FIGS. 2 and 3 above. View 400*b* is a sectional view through the center of plan view 400*a*. Depending on the particulars of the additional coil 302*c*, it may be desirable or even necessary to adapt the configuration to provide the desired electromagnetic properties.

For example, to provide the desired inductance for additional coil 302*c*, additional magnetic core material may be provided. In the illustrated example, additional central core material in the form of a central base portion 404*a* and a post portion 404*b* are provided to provide the desired magnetic properties (e.g., inductance) for coil 302*c*. The illustrated additional core material configuration is but one example, and the details of a particular design may be selected to provide the desired magnetic properties. For example, only post portion 404*b* or only base portion 404*a* could be provided depending on the requirements of a particular application. As another example, multiple "base" portions and/or multiple "post" portions resulting in different numbers of tiers of magnetic material could be provided to achieve the desired geometry and magnetic characteristics.

In the illustrated example, the additional core material includes a central base portion 404*a* that is positioned atop magnetic core 201. In some applications, this central base portion 404*a* could be additional core material that is located atop magnetic core 201. This core material could have the same magnetic properties (e.g., material, magnetic permeability, etc.) as magnetic core 201, or could have differing properties, as desired. In some applications, the central base portion 404*a* could be affixed to magnetic core 201, e.g., using a suitable adhesive. In other applications, the central base portion 404*a* could be formed integrally with magnetic core 201, e.g., by a suitable molding/sintering process. As used herein, base portion 404*a* refers to an additional magnetic core element that is positioned beneath the corresponding additional coil element 302*c*.

Conversely, as used herein, post portion 404*b* refers to an additional magnetic core element that extends through the plane of additional coil 302*c*. In the example of FIG. 4, the additional core material includes a post portion 404*b* that is positioned atop central base portion 404*a*. In some embodiments, the central base portion 404*a* could be omitted, and post portion 404*b* could be positioned on magnetic core 201. In either case, the core material of post portion 404*b* could have the same magnetic properties (e.g., material, magnetic permeability, etc.) as magnetic core 201 and/or central base portion 404*a*, or could have differing properties, as desired. In some applications, the post portion 404*b* could be affixed to central base portion 404*a* or could be affixed to magnetic core 201, e.g., using a suitable adhesive. In other applications, the post portion 404*b* could be formed integrally with central base portion 404*a* and/or with magnetic core 201, e.g., by a suitable molding/sintering process.

Also illustrated in FIG. 4 is an alteration of the position of coils 202*a* and 202*b* to accommodate the above-described changes. More specifically, each of coils 202*a* and 202*b* have been moved outward by a distance "X" to provide a separation between coils 202*a* and 202*b* that accommodates additional coil 302*c*. The distance "X" and thus the separation between coils 202*a* and 202*b* may be selected to accommodate the positioning of additional core material in the form of central base portion 404*a* and/or post portion 404*b*, as illustrated most clearly in view 400*b*. Additionally, or alternatively, the distance "X" may be selected to reduce a degree of coupling between coil 302*c* and coils 202*a*/202*b*. In general, the more overlap between additional coil 302*c* and coils 202*a*/202*b*, the more the flux of one coil will couple to the other, which may be undesirable. Thus, the size (e.g., diameter, inside diameter, and/or outside diameter) of coil 302*c* may be one factor affecting separation between coils 202*a* and 202*b*. Additionally, the dimensions (diameter, inside diameter, and/or outside diameter) may also affect the separation between coils 202*a* and 202*b*. Also, instead of moving coils 202*a* and 202*b* outwards, the desired separation can be achieved by reducing the diameter of the coils by a corresponding amount.

As illustrated in FIG. 4, magnetic core 201 (in the form of a ferrite sheet) is located at the bottom of view 400*b*, with coils 202*a*/202*b* adjacent one another in the same plane above magnetic core 201. Additional coil 302*c* is then located above coils 202*a*/202*b*, with magnet ring 303 disposed above coil 302*c*. In this sense, and as used throughout this application, above is used as a relative direction, and it is to be understood that the coil assembly and/or wireless power transfer device could be oriented in any direction. Thus, when used to describe the interrelationships of the coil assembly components, "above," "below," "beneath," or words of similar import are relative terms describing the stack-up, and not necessarily absolute directions in space. Additionally, although magnet ring 303 is depicted in FIGS. 4 (and 5, below) as being above additional coil 302*c*, magnet ring 303 and additional coil 302*c* could be coplanar or coil 302*c* could be located above magnet ring 303 depending on the construction of the device.

Figure 5:
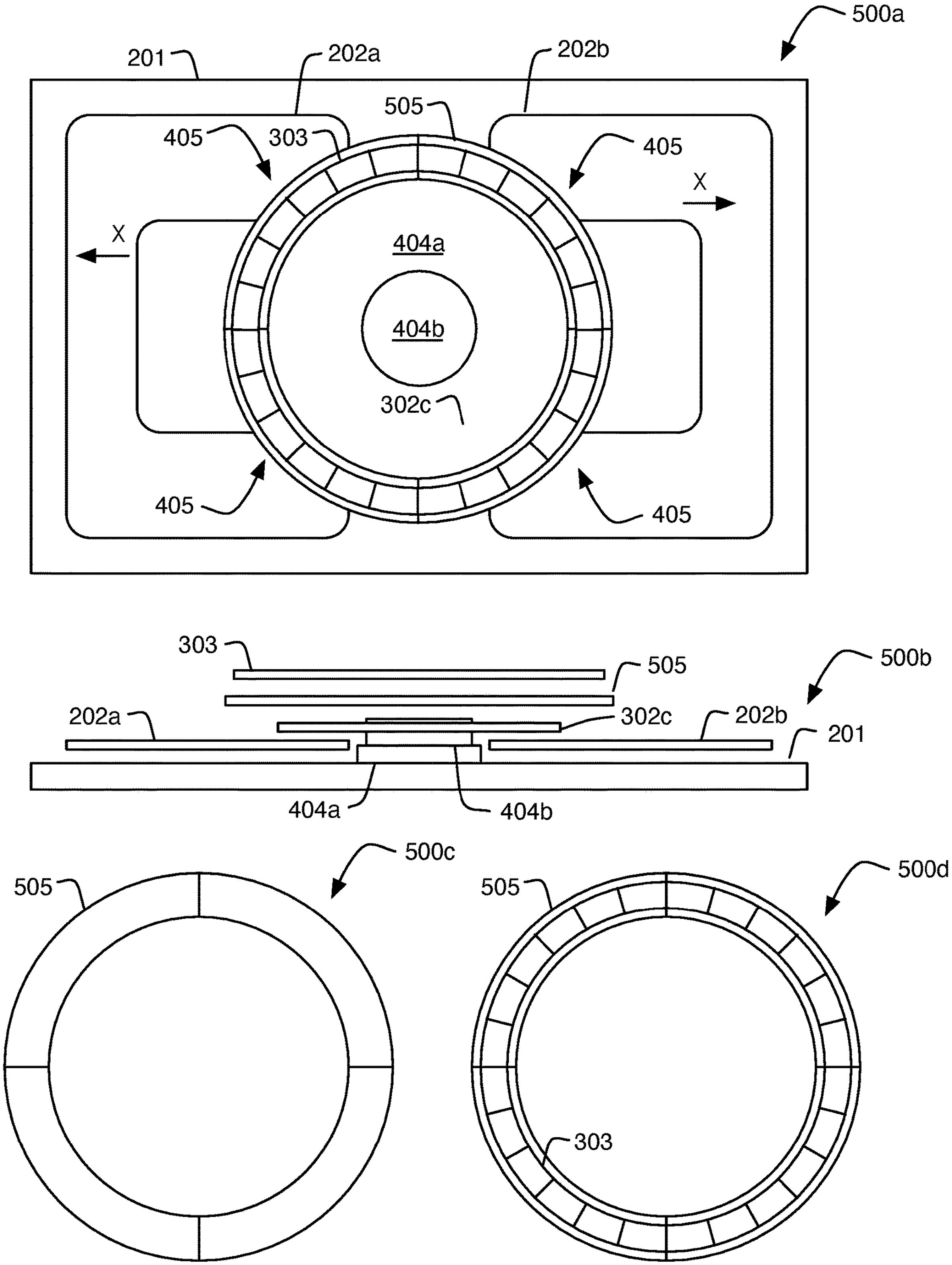
FIG. 5 illustrates an alternative coil configuration of a wireless power transfer device with additional shielding.

Also illustrated in FIG. 4 is an overlap region 405 where magnet ring 303 may interfere with coil 202*b*. Corresponding overlap regions also exist at other positions where the magnet coil is located above coils 202*a* or 202*b*, though for clarity they have not been separately labeled. In at least some applications, the presence of the magnets of magnet ring 303 may affect operation of coil 202*a* and/or 202*b* by interfering with flux coupling between these coils and complementary coils of another wireless power transfer device. To mitigate this situation, FIG. 5 illustrates an alternative coil configuration of a wireless power transfer device with additional shielding. In some embodiments, a wireless power transfer device could be constructed using three coils as illustrated in FIG. 3. In other embodiments, a wireless power transfer device could be constructed using an array of coils as illustrated in FIG. 3. For example, the array could be a rectangular array include multiple rows and/or multiple columns of coils as illustrated in FIG. 3. Alternatively, a circular array could include multiple coil groups as illustrated in FIG. 3 arranged in a circular pattern. In other words, such an array could include multiple groups of the three coils illustrated in FIG. 3.

More specifically, FIG. 5 illustrates a plan view 500*a* of a coil configuration incorporating a shield ring 505, discussed in greater detail below. FIG. 5 also illustrates a section view 500*b* taken through the center of plan view 500*a*. FIG. 5 also illustrates a plan view 500*c* of shield ring 505, as well as a plan view 500*d* of shield ring 505 together with magnet ring 303. Shield ring 505 may be formed as a segmented metallic structure to provide shielding between coil 202*a* and/or coil 202*b* and magnet ring 303. The segmented nature of the ring reduces the available eddy current paths and thus reduces eddy current losses in the shield ring. In the illustrated configuration, four segments of approximately 90 degrees each and a substantially continuous circumference are provided. In this sense substantially continuous circumference means that there is coverage for the vast majority of the of the magnet ring, with interruptions in the segments being small and primarily intended to reduce eddy current paths. Other configurations are also possible. For example, more or fewer segments could be provided. Additionally, the segments need not be immediately contiguous so as to provide a substantially continuous circumference. In other words, larger gaps could be provided between the respective segments. In some embodiments, the angular extent of the respective segments may be selected so that they cover only the overlap regions 405 between the magnet ring and coils 202*a*/202*b*, as the shielding properties of shield ring 505 may not be needed in the region between coils 202*a*/202*b* and/or in the central sections of coils 202*a*/202*b*. As illustrated in view 500*b*, shield ring 505 may be located between magnet ring 303 and coils 202*a*/202*b* that are to be shielded. However, other configurations are also possible. For example, shield ring 505 could be located above magnet ring 303 (and thus between the magnet ring and a complementary wireless power transfer coil of a complementary device) and still provide the desired shielding effect.

In addition to the physical properties of the multi-coil wireless power transfer device described above, it may be desirable to provide additional features and functionality in the electronic systems of the wireless power transfer device to accommodate the multi-coil arrangement. As one example, wireless power transfer devices may incorporate foreign object detection to reduce or inhibit a level of wireless power transfer to avoid delivery of power to a foreign object in the vicinity of the wireless power transfer and receiver. When employing a multi-coil arrangement like that described above, it may be advantageous to adapt the foreign object detection algorithm to account for different electromagnetic environmental properties experienced when operating the respective coils as described in greater detail below.

Figure 6:
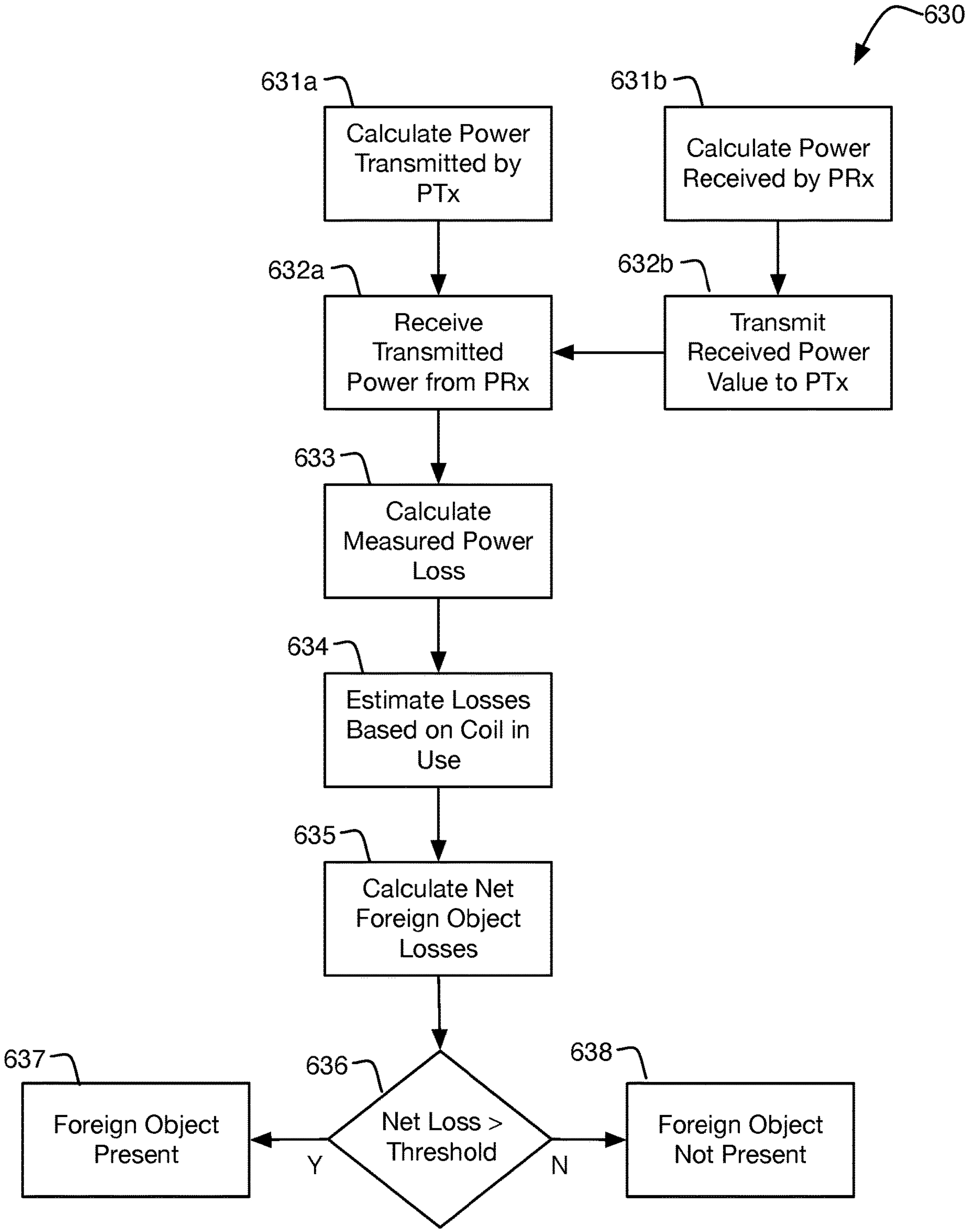
FIG. 6 illustrates a flow chart of a foreign object detection technique based on power accounting for use with different coils of a multi-coil wireless power transfer device.

FIG. 6 depicts a simplified flow chart of a foreign object detection technique 630 based on power accounting. Beginning with block 631*a*, PTx 110 calculates power transmitted by the PTx. This can be achieved by multiplying the output voltage of inverter 114 by the current through transmit coil 112. Correspondingly, block 631*b* calculates power received by PRx 120. This can be achieved by multiplying the current through receiver coil 122 by the output voltage of rectifier 124. Depending on the efficiency of the inverter and rectifier and how it is accounted for, either their input or output currents and/or voltages could be used. The respective voltages and currents may be monitored sensors coupled to the respective controller circuitry located in controller and communications modules 116 (for PTx 110) and 126 (for PRx 120). Implementation of such measurement systems is known to those skilled in the art, and thus is not repeated here.

In block 632*b*, PRx 120 can communicate the received power value to PTx 110, which it receives as illustrated in block 632*a*. This discussion assumes that the foreign object detection is performed by PTx 110, for example by circuitry located in controller/communications module 126. However, in some applications, the foreign object detection process could run on PRx 120, in which case PTx 110 could transmit its measured power value to PRx 120. In either case, this could take place either by in-band communication (involving modulation of the voltage, current, frequency, phase, etc. wireless power transferred) or out-of-band communication using separate communications modules 118/128 and separate communications channel 138, which could be near field communication (NFC), Bluetooth communication, WiFi communication, etc. as discussed above. Alternatively, rather than transmit calculated power values, the device could transmit the underlying measurements (e.g., voltage and current measurements) that would allow the counterpart device to calculate the respective power.

In either case, in block 633, the PTx (or PRx, if it is performing foreign object detection) can calculate the measured power loss as the difference between transmitted power and received power. As noted above this measured power loss can include two components: friendly metal losses (associated with either PTx 110 or PRx 120) and foreign object losses. Thus, in block 634, the PTx (or PRx, if it is performing foreign object detection) estimates the based on the coil in use. In a wireless power transfer device as described above, the losses associated with wireless power transfer, including, for example, so-called "friendly metal" losses may vary based on which of the coils is in use. To account for this, the controller circuitry may be provided with parameters to estimate the losses based on which of the plurality of coils is in use. Then, during a power transfer operation, the appropriate parameters may be selected by the controller to perform loss estimation based on which coil is in use. For purposes of this discussion, estimation of the losses may be thought of as a computation based on observable circuit parameters (voltages, currents, coupling factors, etc.) and predetermined parameters that relate these observable circuit parameters to the resulting losses for a particular coil. These parameters may be part of a model that can be analytically or empirically derived during the design of a particular wireless power transfer device. These model parameters may be stored in a memory associated with a controller of the respective wireless power transfer device and either used by that device to estimate its friendly metal losses or provided to a counterpart device to allow that device to estimate the friendly metal losses of its counterpart.

Once the friendly metal losses have been estimated/determined (block 634), the device performing the foreign object detection can calculate the net foreign object losses (block 635), which can be the difference between the calculated measured power loss (block 633) and the estimated friendly metal losses (block 634). The net foreign object losses can then be compared to a net loss threshold (block 636). If the net foreign object losses are less than the threshold, then it can be inferred that no foreign object is present (block 638) and no mitigation is required. Alternatively, if the net foreign object losses are greater than the threshold (block 636), then it can be inferred that a foreign object is present (block 637) and some mitigation may be employed. Such mitigations can include reducing or limiting the amount of power transferred, stopping power transfer, providing a notification to the user, such as an audiovisual alert, etc.

Described above are various features and embodiments relating to multi-coil configurations for wireless power transfer devices. Such arrangements may be used in a variety of applications but may be particularly advantageous when used in conjunction with electronic devices such as mobile phones, tablet computers, laptop or notebook computers, and accessories, such as wireless headphones, styluses, etc. Additionally, although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The foregoing describes exemplary embodiments of wireless power transfer systems that are able to transmit certain information amongst the PTx and PRx in the system. The present disclosure contemplates this passage of information improves the devices' ability to provide wireless power signals to each other in an efficient manner to facilitate battery charging, such as by sharing of the devices' power handling capabilities with one another. Entities implementing the present technology should take care to ensure that, to the extent any sensitive information is used in particular implementations, that well-established privacy policies and/or privacy practices are complied with. In particular, such entities would be expected to implement and consistently apply privacy practices that are generally recognized as meeting or exceeding industry or governmental requirements for maintaining the privacy of users. Implementers should inform users where personally identifiable information is expected to be transmitted in a wireless power transfer system and allow users to "opt in" or "opt out" of participation. For instance, such information may be presented to the user when they place a device onto a power transmitter, if the power transmitter is configured to poll for sensitive information from the power receiver.

Risk can be minimized by limiting the collection of data and deleting data once it is no longer needed. In addition, and when applicable, data de-identification can be used to protect a user's privacy. For example, a device identifier may be partially masked to convey the power characteristics of the device without uniquely identifying the device. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy. Robust encryption may also be utilized to reduce the likelihood that communication between inductively coupled devices are spoofed.

The invention claimed is:

1. A multi-coil wireless power transfer arrangement comprising:
- a magnetic core;
- first and second wireless power transfer coils positioned adjacent one another above the magnetic core;
- a third wireless power transfer coil positioned above the first and second wireless power transfer coils;
- a magnet ring located above the first and second wireless power transfer coils;
- additional magnetic core material disposed atop the magnetic core and associated with the third wireless power transfer coil, wherein the first and second wireless power transfer coils are separated by a separation distance selected to accommodate the additional magnetic core material; and
- a segmented metallic shield positioned between the magnet ring and the first and second wireless power transfer coils.

2. The multi-coil wireless power transfer arrangement of claim 1 wherein the additional magnetic core material comprises:
- a base portion disposed atop the magnetic core and beneath the third wireless power transfer coil; and
- a post portion disposed atop the base portion and within the third wireless power transfer coil.

3. The multi-coil wireless power transfer arrangement of claim 1 wherein the separation distance is further selected to reduce coupling between the first or second wireless power transfer coil and the third wireless power transfer coil.

4. A multi-coil wireless power transfer arrangement comprising:
- a magnetic core;
- first and second wireless power transfer coils positioned adjacent one another above the magnetic core;
- a third wireless power transfer coil positioned above the first and second wireless power transfer coils; and
- a magnet array located above the first and second wireless power transfer coils.

5. The multi-coil wireless power transfer arrangement of claim 4 wherein the first, second, and third wireless power transfer coils are part of an array of wireless power transfer coils, the array including multiple first and second wireless power transfer coils and multiple third wireless power transfer coils.

6. The multi-coil wireless power transfer arrangement of claim 4 further comprising additional magnetic core material associated with the third wireless power transfer coil.

7. The multi-coil wireless power transfer arrangement of claim 6 wherein the additional magnetic core material comprises at least one base portion disposed atop the magnetic core and beneath the third wireless power transfer coil.

8. The multi-coil wireless power transfer arrangement of claim 7 wherein the additional magnetic core material comprises at least one post portion disposed atop the base portion and within the third wireless power transfer coil.

9. The multi-coil wireless power transfer arrangement of claim 6 wherein the additional magnetic core material comprises at least one post portion disposed atop the magnetic core and within the third wireless power transfer coil.

10. The multi-coil wireless power transfer arrangement of claim 6 wherein the additional magnetic core material is affixed to the magnetic core.

11. The multi-coil wireless power transfer arrangement of claim 6 wherein the additional magnetic core material is formed integrally with the magnetic core.

12. The multi-coil wireless power transfer arrangement of claim 6 wherein the first and second wireless power transfer coils are separated by a distance selected to accommodate the additional magnetic core material.

13. The multi-coil wireless power transfer arrangement of claim 4 wherein the first and second wireless power transfer coils are separated by a distance selected to reduce coupling between the first or second wireless power transfer coil and the third wireless power transfer coil.

14. The multi-coil wireless power transfer arrangement of claim 4 wherein the first and second wireless power transfer coils have at least one of a different operating mode or a different operating frequency than the third wireless power transfer coil.

15. The multi-coil wireless power transfer arrangement of claim 4 further comprising a shield positioned beneath the magnet array.

16. The multi-coil wireless power transfer arrangement of claim 15 wherein the shield is a segmented metallic ring.

17. The multi-coil wireless power transfer arrangement of claim 4 further comprising a shield positioned above the magnet array.

18. The multi-coil wireless power transfer arrangement of claim 17 wherein the shield is a segmented metallic ring.

19. A wireless power transfer device comprising:

power conversion circuitry coupled to a multi-coil wireless power transfer arrangement; and control circuitry coupled to the power conversion circuitry that operates the power conversion circuitry to facilitate wireless power transfer via the multi-coil wireless power transfer arrangement;

wherein the multi-coil wireless power transfer arrangement further comprises:

a magnetic core;

first and second wireless power transfer coils positioned adjacent one another above the magnetic core;

a third wireless power transfer coil positioned above the first and second wireless power transfer coils; and a magnet ring located above the first and second wireless power transfer coils.

20. The wireless power transfer device of claim 19 further comprising additional magnetic core material associated with the third wireless power transfer coil.

21. The wireless power transfer device of claim 20 wherein the first and second wireless power transfer coils are separated by a distance selected to perform at least one of:

accommodating the additional magnetic core material; or reducing coupling between the first or second wireless power transfer coil and the third wireless power transfer coil.

22. The wireless power transfer device of claim 19 wherein the first and second wireless power transfer coils have a different operating mode or a different operating frequency than the third wireless power transfer coil.

23. The wireless power transfer device of claim 19 wherein the control circuitry performs foreign object detection by power accounting and to adapt a loss estimation portion of the power accounting based on which of the first, second, or third wireless power transfer coils is in use.

24. The wireless power transfer device of claim 19 further comprising a segmented metallic shield positioned between the magnet ring and the first and second wireless power transfer coils.

* * * * *